UNITED STATES PATENT OFFICE.

CHARLES H. DASHER, OF OAKLAND, CALIFORNIA.

PROCESS OF PURIFYING ALKALINE CHLORIDS.

956,303. Specification of Letters Patent. Patented Apr. 26, 1910.

No Drawing. Application filed September 20, 1909. Serial No. 518,701.

*To all whom it may concern:*

Be it known that I, CHARLES H. DASHER, a citizen of the United States, residing at Oakland, in the county of Alameda and State of California, have invented new and useful Improvements in Processes of Purifying Alkaline Chlorids, of which the following is a specification.

The object of this invention is the separation of the alkaline earths and earth metals such as calcium, magnesium and aluminum from chlorids of sodium and potassium, whereby a salt of high purity either for household purposes or for electrolyzing either fused or in water solution is produced. As this process has particular application to purifying sodium chlorid, this salt will be considered specifically, it being understood that the process is equally applicable to potassium chlorid or a mixture of the salts.

The sodium chlorid produced by evaporation from sea-water and salt lakes and by mining from deposits of crystallized salt generally contains as impurities the chlorids and sulfates of calcium and magnesium with traces of iron and aluminum salts. There is often considerable organic matter. This impure sodium chlorid fuses at about 780° centigrade to a very fluid mass, and if the temperature is not allowed to rise much above 800° centigrade little volatilization takes place. The organic matter may entirely burn out during fusion or finely divided carbon from its reduction may remain in suspension. The impurities are all in solution or suspension in the liquid sodium chlorid. If silica ($SiO_2$) and either sodium carbonate ($Na_2CO_3$) or sodium bicarbonate ($NaHCO_3$) be added to the fused chlorid, the carbonate rapidly dissolves and a violent reaction ensues with the evolution of gas. The silica changes to a pasty mass that gradually settles through the fused chlorid as the evolution of gas diminishes. This reaction, for instance in the case of salt containing magnesium chlorid and magnesium sulfate, is probably of the following type:

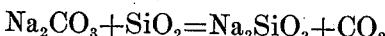
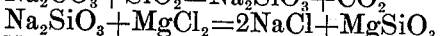
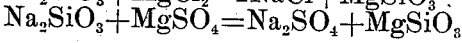

the final result being the reduction of all the alkaline earths and earth metals to silicates and the production of sodium chlorid and sulfate in their place.

The amount of carbonate used is determined according to the above reaction for the complete conversion of the impurities present into silicates; but I use a relatively greater mass of silica than shown by the above reaction and treat the fused salt for a sufficient length of time to form silicates more highly siliceous than the metasilicate shown by the above reaction. This is probably of the following type:

I have found this necessary in practice as otherwise the silicates that are first formed are partially soluble in the molten salt and it is the aim of this process to produce silicates that are insoluble in the fused salt and infusible at the temperature of the fusion. The length of time necessary for this treatment is best determined by withdrawing samples and testing them, but one hour is usually ample time. Any suspended carbon in the mass is removed by the $CO_2$ gas according to the reaction

or is mechanically infolded by the pasty silicates.

A convenient way of providing sufficient mass of silica is to have the furnace wherein fusion takes place lined with it; though any lining on which the fused salt has no action, as fire clay, may be used and the necessary silica added to the charge at any convenient time.

When the treatment is finished the liquid salt is drawn from the furnace and the precipitated silicates may be separately removed. If complete subsidence of the silicates has not occurred and particles are in suspension, the liquid salt may be filtered through sand of silica or any neutral substance contained in a proper receptacle and heated to the temperature of fusion of the salt.

Having described my process, what I claim and desire to secure by Letters-Patent, is:

1. The method of purifying sodium chlorid which consists in fusing it so that all the impurities are in solution or suspension, and adding silica and a sodium salt to the fused mass, the amount of silica used being sufficient to produce silicates that are insoluble in the fused sodium chlorid.

2. The method of purifying sodium chlorid which consists in fusing the salt at approximately 780° centigrade, adding silica and a suitable alkaline carbonate to decompose and precipitate the impurities as silicates, and then separating the purified salt from the precipitated impurities.

3. The method of purifying sodium chlorid which consists in fusing the salt at approximately 780° centigrate, adding silica and a suitable alkaline carbonate to decompose and precipitate the impurities as silicates, and then separating the purified salt from the precipitated impurities, the amount of silica above added being sufficient to produce silicates that are insoluble in the fused mass, and infusible at said temperature.

4. The method of purifying sodium chlorid which consists in fusing it, adding silica and sodium carbonate and continuing the fusion until the silica changes to a pasty mass that gradually settles through the fused chlorid as the evolution of gas diminishes, the amount of the carbonate and silica used being sufficient for the complete conversion of the impurities present into insoluble and infusible silicates.

5. The method of purifying sodium chlorid which consists in fusing the salt at approximately 780° centigrade so that all the impurities are in solution or suspension, adding thereto silica and sodium carbonate to decompose and precipitate the impurities as silicates, the amount of silica added being sufficient to produce silicates that are insoluble in the fused salt and infusible at said temperature, and then separating the purified salt from the precipitated impurities by either decantation or filtration.

In testimony whereof I have hereunto set my hand in the presence of two subscribing witnesses.

CHARLES H. DASHER.

Witnesses:
H. G. MITCHELL,
J. O. HANORY.